United States Patent [19]

Haddock

[11] Patent Number: 5,089,693
[45] Date of Patent: Feb. 18, 1992

[54] READER/WRITER FOR ARCUATELY FLEXED DATA CARDS

[75] Inventor: Richard Haddock, Redwood City, Calif.

[73] Assignee: Drexler Technology Corporation, Mountain View, Calif.

[21] Appl. No.: 499,859

[22] Filed: Mar. 26, 1990

Related U.S. Application Data

[63] Continuation-in-part of Ser. No. 162,918, Mar. 2, 1988, Pat. No. 4,912,312, which is a continuation-in-part of Ser. No. 937,648, Dec. 2, 1986, Pat. No. 4,820,913.

[51] Int. Cl.⁵ .................... G06K 7/10; G06K 7/015
[52] U.S. Cl. .................... 235/486; 235/479; 235/454; 235/487; 369/263; 360/2
[58] Field of Search .............. 235/454, 449, 474, 475, 235/479, 486, 487; 346/76 L, 138; 369/34, 36, 37, 179, 192, 263, 270, 271; 360/2, 87, 100.1

[56] References Cited

U.S. PATENT DOCUMENTS

| | | | |
|---|---|---|---|
| 3,512,130 | 5/1970 | Hulett | 235/454 |
| 3,654,624 | 4/1972 | Becker et al. | 346/138 |
| 4,212,037 | 7/1980 | Lemelson | 360/2 |
| 4,260,998 | 4/1981 | Fukui | 346/138 |
| 4,390,176 | 6/1983 | Kato | 346/138 |
| 4,501,959 | 2/1985 | Stockburger et al. | 235/486 |
| 4,536,648 | 8/1985 | Kruse et al. | 235/454 |
| 4,578,717 | 3/1986 | Lemelson | 360/2 |
| 4,820,913 | 4/1989 | Haddock | 235/454 |
| 4,903,957 | 2/1990 | Binder et al. | 346/138 |

Primary Examiner—Robert Weinhardt
Attorney, Agent, or Firm—Schneck & McHugh

[57] ABSTRACT

A reader/writer device for flexible data cards is disclosed. The device includes a pair of pivotal arms which are adapted to receive a data card in a flat position and then to bend the card into a substantially cylindrical shape. A rotatable transducer is located so that its axis of rotation coincides with the axis of the cylindrically bent data card. The recording medium on the data card faces the transducer such that the transducer scans in lines which are parallel to the data tracks set forth on recording medium. High speed data reading and writing may be accomplished in this manner.

23 Claims, 3 Drawing Sheets

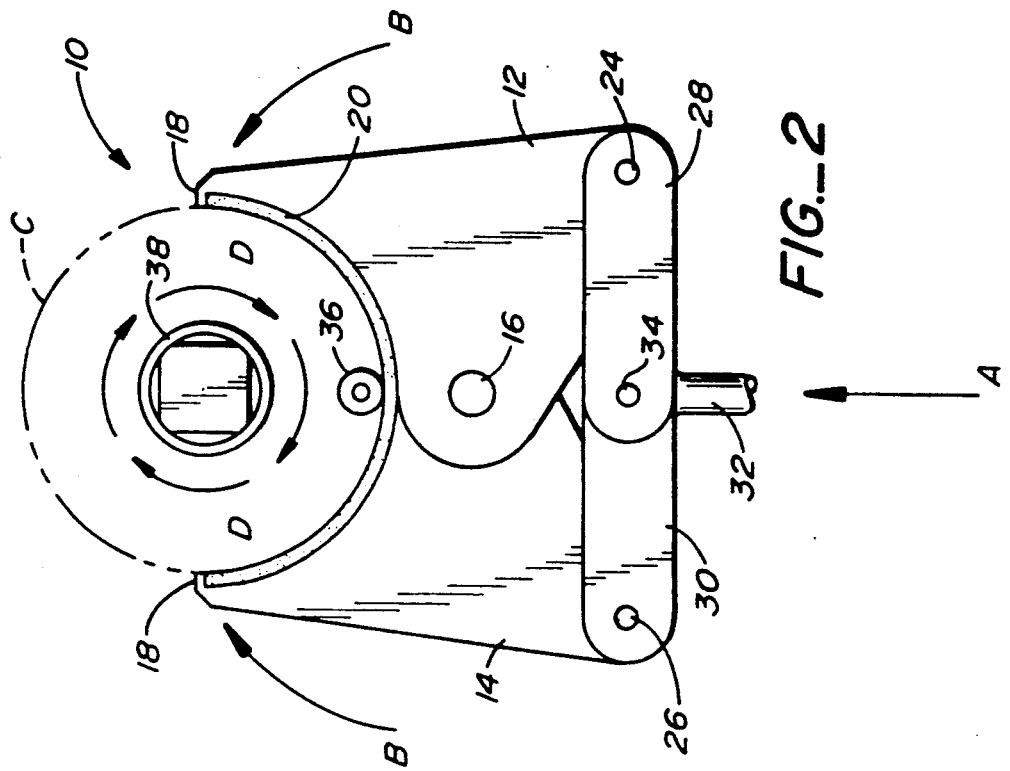
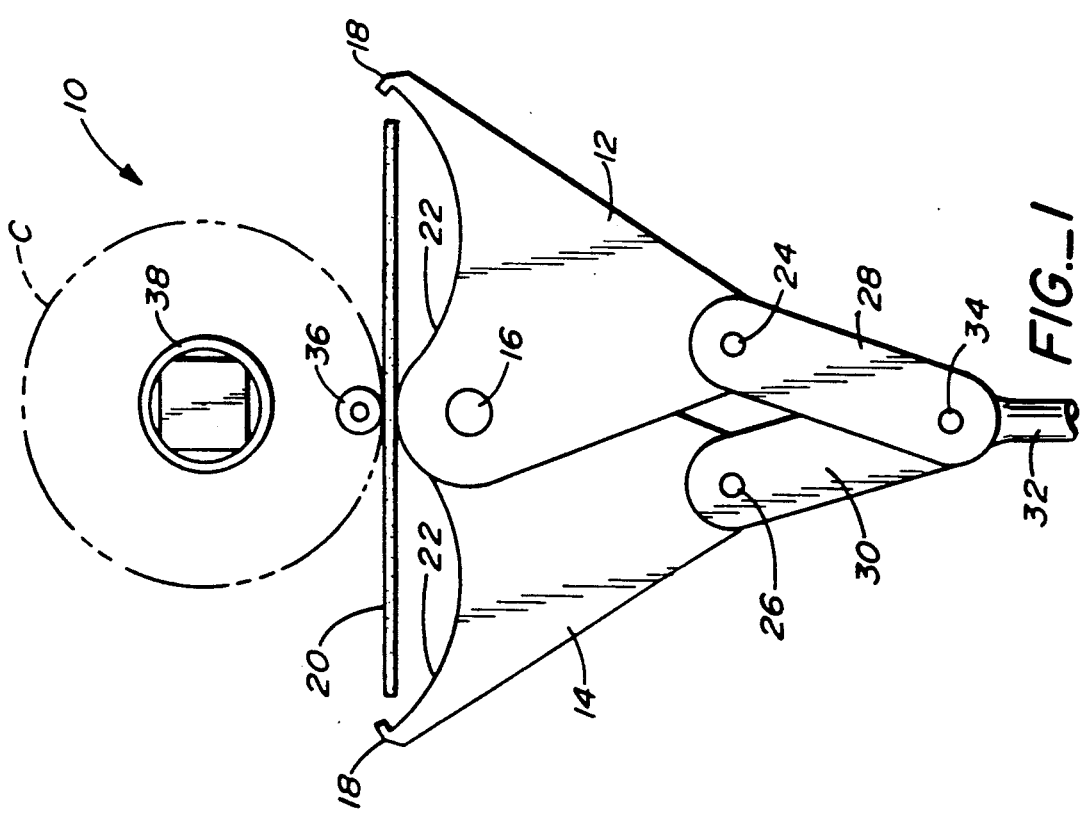

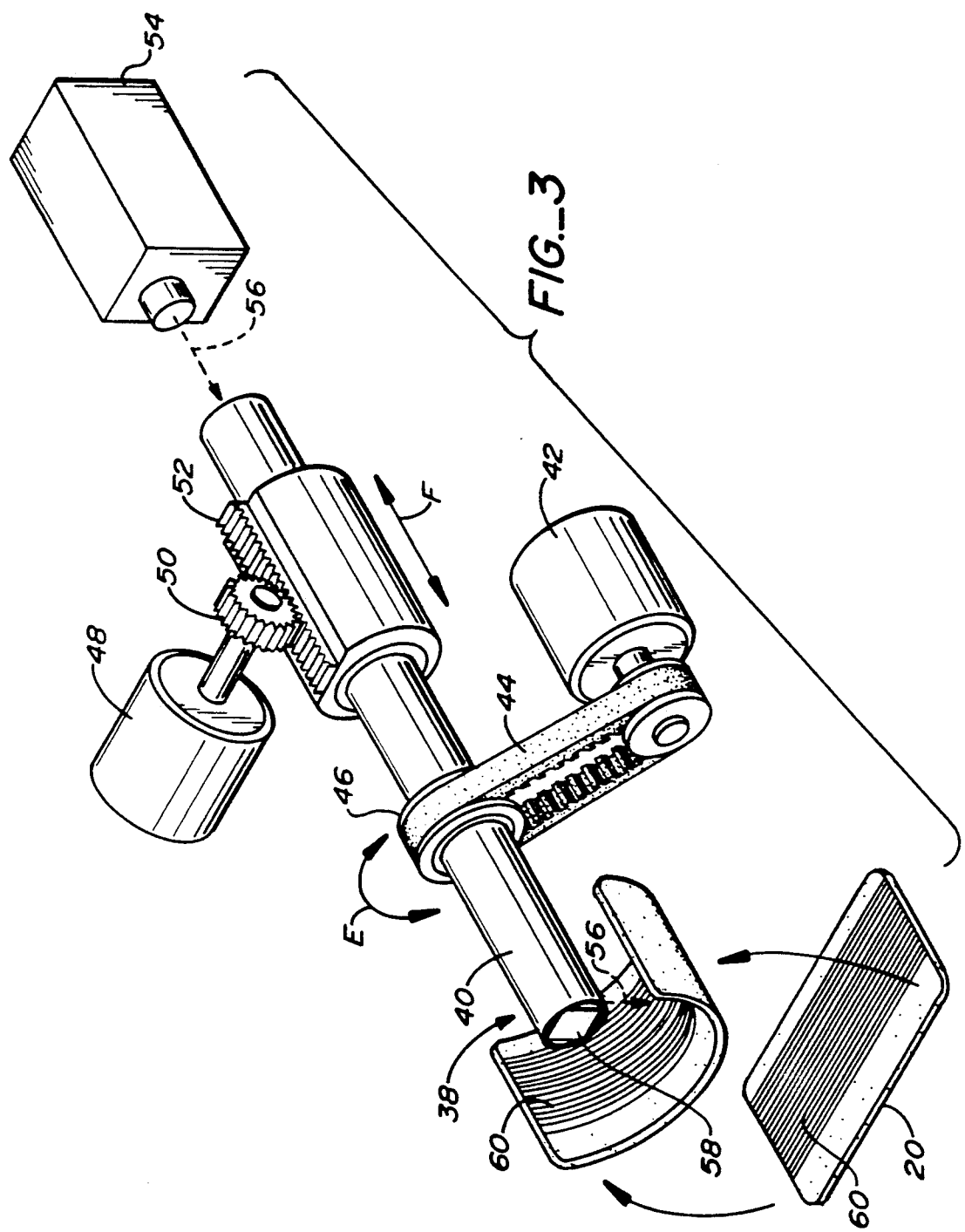
FIG._3

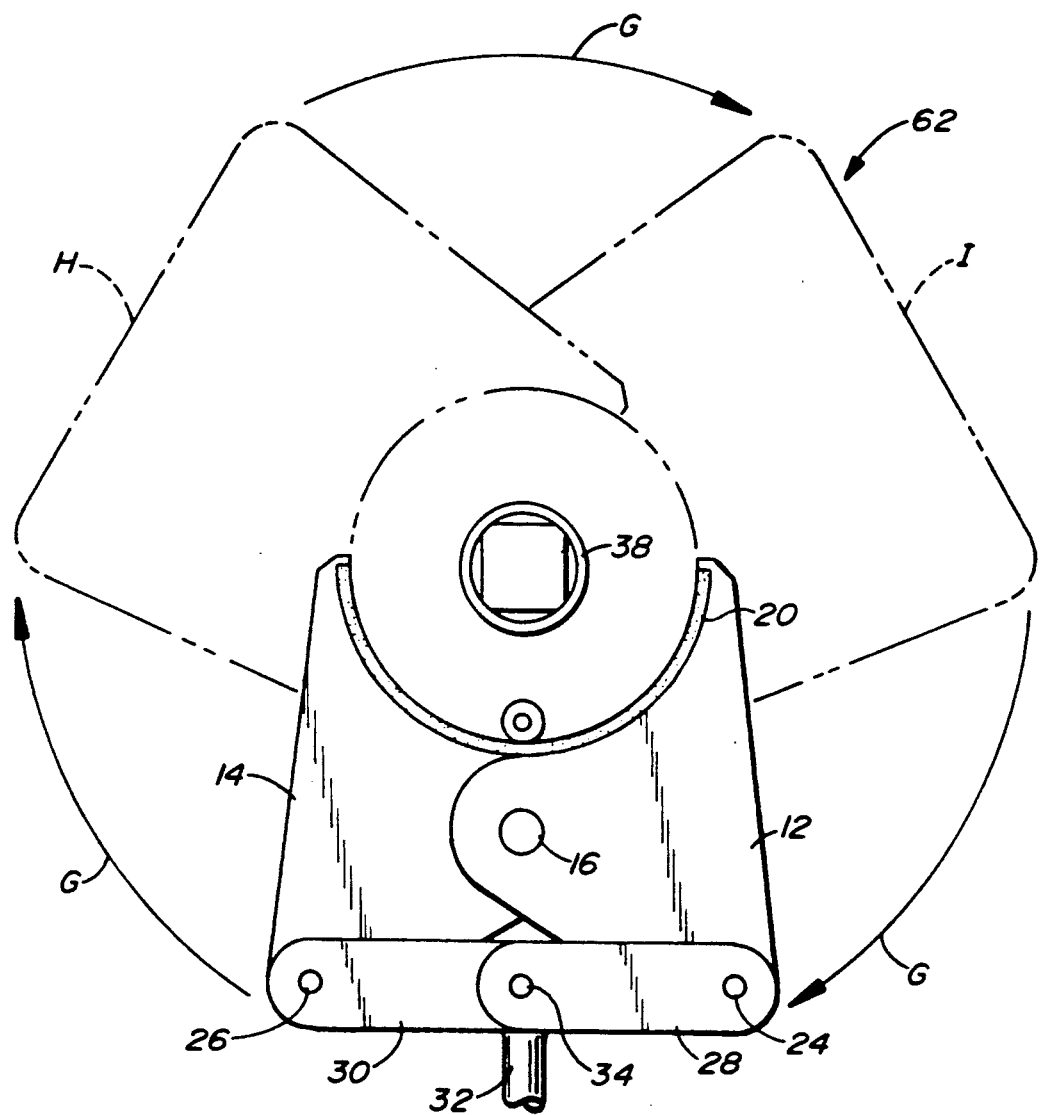
FIG._4

READER/WRITER FOR ARCUATELY FLEXED DATA CARDS

CROSS-REFERENCE TO RELATED APPLICATION

This is a continuation-in-part of application Ser. No. 07/162,918, filed Mar. 2, 1988, now U.S. Pat. No. 4,912,312; which is a continuation-in-part of application Ser. No. 06/937,648, filed Dec. 2, 1986, now U S. Pat. No. 4,820,913.

TECHNICAL FIELD

The present invention relates to optical data storage and in particular to systems for recording and reading optical data on flexible cards.

BACKGROUND ART

In U.S. Pat. No. 4,360,728, Drexler discloses a data card writing and reading system in which a laser light source emits a beam directed onto a flatly held card. In a coarse mode of operation a first servo-controlled mirror is mounted for rotation in order to find the lateral edges of a strip of laser recording material which is disposed on a surface of the card. Then, in a fine mode of operation data paths are identified which exist at predetermined distances from the edges. A second servo-controlled mirror is mounted for rotation in order to scan the beam in a fine mode of operation along the length of the card. Coarse control of the lengthwise position of the card is achieved by motion of a card shuttle.

When recording, the beam produces light scattering or absorbing spots in the laser recording material. The spots which represent data bits are aligned in parallel data tracks. The data bits are read by using a reduced power laser beam and a photodetector which detects differences in reflectivity between a spot and the surrounding material.

In U.S. Pat. No. 3,654,624, Becker et al. disclose a laser recording system in which a flat elongated record strip is wound around the surface of a drum. The drum is rotated with respect to the laser beam during recording and reproducing operations. By means of a servo-controlled linear positioning mechanism, the laser beam is moved transversely to the direction of drum rotation to permit selection of any one of a large number of spaced parallel scan lines on the record strip.

In U.S. Pat. No. 3,795,902 an optical reader is disclosed for reading digital data recorded in arcuate and spiral data tracks on a flat data record. A light beam is caused to scan across the data record along the curved data tracks. This provides high reading speeds, but many industries have adopted optical formats having straight, parallel data tracks.

Within the field of data cards there are occasions when there is a need to record several to perhaps thousands of data cards with the same or similar information. A typical optical card reader/writer has a recording speed of about 10,000 up to 100,000 data spots per second. Thus, it would require up to about 30 minutes to fill a single card with 2 megabytes of data. Although lasers are capable of generating pulses at a rate exceeding 200,000 per second the overall recording speed is reduced by the continuous accelerations and decelerations involved in card motion relative to a fixed laser, or vice versa. A need to synchronize laser beam pulses with the speed and position of the card also reduces the recording speed.

In U.S. Pat. No. 4,820,913 a data card recording system is disclosed which records identical data on each of a plurality of optical data cards supported around the surface of a drum. Each card contains a strip of optical recording material on its surface. The drum is mounted for rotation and may have flanges set in the circumference for gripping the longitudinal ends of the cards. Alternatively, the drum may comprise a pair of concentric cylinders in which the cards are mounted between the cylinders. The recording strips of these cards face outward. A light source emits a light beam which is directed along an optical path to the cards, so that as the drum rotates, the light beam produces data spots corresponding to a stored data segment.

The data tracks on the recording strips are aligned in the direction of drum rotation. The relative transverse position between the light beam and the cards is movable, as by moving an element in the beam path, so that additional data segments may be recorded in multiple parallel tracks on each of the cards. Recording is complete when the data cards are each filled with identical information or when all data segments have been recorded. A photodetector may be positioned for reading a track on a card, by measuring changes in the optical contrast of data spots and the surrounding recording material.

Although the above multi-card recording system duplicates cards very rapidly, the cards produced are not suited to all applications, particularly high speed reading with CCD arrays. Thus, in U.S. Pat. No. 4,912,312, a multiple-card recording system is disclosed in which the data cards are mounted to a rotatable drum with the length of the recording strips parallel to the axis of the drum. In contrast, then, to the prior drum recording system, wherein the recording medium had its lengthwise direction parallel to the direction of drum rotation, the recording system disclosed here has its widthwise direction parallel to the direction of drum rotation. As the drum rotates, each card passes a laser writer which records the same or a different data segment onto each card until the drum makes one complete revolution. Then, the laser writer is translated with respect to the cards and the next data segment or segments is written on each card. After completion of the next drum rotation the process is repeated and so on, until all the cards are completely written.

An advantage of this multi-card recording system is that by recording the data in a widthwise direction high speed card readers employing CCD arrays may be used. Such high speed readers read across the width of the card as the card is advanced through the reader. This allows the card to pass beneath the CCD array disposed over the data strip and provides for high speed reading of entire rows of data.

While the above two multi-card recording systems rapidly produce recorded data cards, these systems do not in themselves provide high speed reading of a particular data card. Moreover, while it is advantageous to record multiple cards with the same or similar data, at the same time, it is not generally required to read multiple cards at the same time. For this reason readers and writers for individual cards, like that disclosed in previously discussed U.S. Pat. No. 4,360,728, have been designed. With reader/writers designed for individual card use it is often desirable to have a compact design. And since these devices may also serve as remote facilities, such as automatic teller machines, it is desirable that they be highly reliable and require little maintenance.

Thus, in view of the above, it is an object of the present invention to design a high speed optical data card reader/writer for use with individual cards having straight, parallel data tracks.

It is another object of the present invention to design an optical data card reader/writer which is compact in design and which is highly reliable.

SUMMARY OF THE INVENTION

The above objects have been achieved by an apparatus for reading and writing onto optical or magnetic data cards in which the reading and writing elements do not reverse direction with respect to the card. The reader/writer comprises a card holder which is adapted to receive a flexible wallet-sized data card. The card contains a strip of optical recording material, which is disposed lengthwise on the card. Once the flexible card is received by the reader/writer it is then bent by the card holder, such that it forms a portion of a cylinder. The card is then maintained in this shape while reading and writing operations are performed on the card by a transducer which rotates relative to the bent data card.

The data tracks on the recording strip are often oriented in the lengthwise direction of the card. When this is the case, the card is bent about its lengthwise direction with the recording strip facing inwardly. That is, when bent the recording strip is on the inside of the cylinder. Alternatively, when the data tracks are oriented in the widthwise direction the card is bent in that direction. For brevity only lengthwise bending will be fully described. Whichever direction the card is bent, a transducer is provided such that it rotates relative to the card about the axis of the cylinder made by the bent card. In this manner a data track can be rapidly read or written on. Lateral positioning between the transducer and the data card is also provided so that the transducer may be moved relative to the card to read or write on other data tracks. This would allow successive tracks to be rapidly accessed.

The card holder includes a pair of arms specifically adapted to receive a data card. The arms are pivotally coupled to one another. Each arm has an arcuately curved card receiving side and a slight extension which holds a card between the arms. The arms are both connected to a three-bar linkage which actuates the arms, along the same general principle as a pair of pliers. As the arms are brought together the card begins to bend. Due to the card receiving sides forming a circular shape, as they are brought together, the card essentially takes on the shape of a portion of a cylinder, as seen from a side view. To facilitate bending a pinch roller may be used to initiate bending.

Once the card has been bent into a cylindrical shape, reading and writing may take place on the card at high speed. Unlike flat card readers and writers, a transducer may be rotated relative to the bent card in a straight line. For example, the bent data card may be held stationary while an optical transducer is rotated about the same axis as the cylinder of which the bent card forms a part. This would then allow for continuous reading and writing on the data card without changes in the direction of scanning. Thus, a high speed reading and writing device for individual optical cards is provided. Also, the design may be relatively compact due to having the cylindrical axis of the data card and the axis of rotation of the transducer coincide. In addition, since fewer accelerations and decelerations occur during the operation of this device, as opposed to flat card devices, it is expected to be highly reliable.

BRIEF DESCRIPTION OF THE DRAWINGS

FIG. 1 is a plan view of a reader/writer apparatus in a card receiving position.

FIG. 2 is a plan view of the reader/writer apparatus of FIG. 1 shown in a read/write position.

FIG. 3 is a simplified partial perspective view of the reader/writer apparatus of FIGS. 1 and 2.

FIG. 4 is a plan view of an alternative embodiment of a reader/writer apparatus shown in a read/write position.

BEST MODE FOR CARRYING OUT THE INVENTION

Referring to FIG. 1, a reader/writer device 10 is shown having a pair of arms 12 and 14. The arms are pivotally coupled at a pivot point 16. Each arm 12 and 14 has an extension 18 located at an end of the arm for securing a data card 20 between the arms. Each arm further has a card receiving side 22 which is arcuately curved. Also coupled to the arms 12 and 14 at pivot points 24 and 26 respectively, are a three-bar linkage. The linkage includes a pair of links 28 and 30 which are pivotally connected at a pivot point 34 to an actuating rod 32. The actuating rod 32 is coupled to an actuator, not shown.

The arms 12 and 14 together with the actuating members of the three-bar linkage form a card holder mechanism. As shown in FIG. 1, the card holder is in an open position. The data card 20 can be seen to lie between the extensions 18 of the arms with a little space therebetween. The reason for having this space will become apparent during the discussion of FIG. 2 below. The card 20 in this position is substantially flat and is being slightly pinched between the card receiving sides 22 and a cylindrical pinch roller 36. It is noted that the radius of the pinch roller 36 is less than the radius of the card receiving sides 22 at the points of contact. This helps initiate bending of the card 20. The pinch roller 36 is also designed with a length, so that it does not interfere with reading or writing on the card.

Referring now to FIG. 2, the data card 20 is seen to have taken on a cylindrical shape. The bending of the card in this manner takes place because as the actuator rod 32 is moved in the direction indicated by arrow A, the arms 12 and 14 are caused to move towards each other in the direction indicated by arrows B. Due to the arcuate shape of the card receiving sides 22 and the extensions 18, the card 20 conforms to the arcuate shape of the card receiving sides 22. The card holder is shown here in a desired position which will hereinafter be referred to as the clamped position. While in the clamped position, the card 20 forms a portion of a cylinder identified by dashed line C. This occurs because the card receiving sides 22 of the arms 12 and 14 are designed to cooperate together, such that they form a portion of a cylinder at the clamped position. The extensions 18 assist in making the card 20 conform to the cylindrical shape by exerting a compressive force on the lateral edges of the card. Thus, the card holder is specifically designed for a predetermined length. Generally this will be about 85 mm. Once the card is bent into the desired cylindrical shape, a transducer 38 may be used to read and write on the card. In a preferred embodiment the transducer 38 rotates, as indicated by arrows D, and the data card 20 remains stationary.

FIG. 3 illustrates the elements of the transducer 38 and the means for positioning and rotating the transducer relative the data card 20. A central, hollow tubular housing 40 is coupled to rotation motor 42 through a belt 44 and a pulley wheel 46 attached to the tubular housing. The tubular housing 40 is supported for rotation in the directions indicated by arrow E. An in/out motor 48 provides relative lateral movement, indicated by arrow F, between the transducer 38 and the card 20. A spur gear 50 associated with the in/out motor 48 couples with a gear-toothed collar 52 mounted to the tubular housing 40 to provide the relative lateral movement. Other means may be used to provide lateral movement, such as induction motors.

The transducer 38 may comprise a laser 54 which emits a laser beam 56 that passes through the hollow center of the tubular housing 40. At the end of the housing is a 45° mirror 58, or the like, which deflects the laser beam 56 onto the card 20. The card 20 contains a recording strip 60 made of an optical recording material. The intensity of the laser beam 56 may be modulated, such that at one intensity the beam creates pits in the recording strip. And at a lower intensity, the beam simply illuminates the recording strip 60 for reading purposes. A photodetector, not shown, may also be housed within the tubular housing 40 to detect data bits, as is known in the art. Multiple laser beams may be used to increase read/write speed and data access. A magnetic transducer working with magnetic media could also be used.

FIG. 4 illustrates an embodiment 62 wherein the card holder and data card 20 rotate about the transducer 38. The end result is essentially the same as with the embodiment 10, shown in FIGS. 1 and 2, wherein the transducer 38 rotates. However, in this embodiment 62 a rotational device, not shown, is connected to the card holder causing the card 20 to rotate in the direction indicated by arrow G. To illustrate the rotational movement of the card holder, it is shown in phantom at successive positions H and I.

In embodiment 62, the entire card holder and associated apparatus may rotate about the transducer 38, but it would be more practical to just rotate the card holder. Therefore, the card holder may be disconnected from the actuator connected to the actuator rod 32. The card 20 would then have to be locked in place within the card holder. This may be accomplished by designing the card holder assembly, as shown, to have links 28 and 30 be parallel when the card 20 is in the clamped position.

The materials used to make the card holder and other related mechanical elements need to be durable and able to function a long time under cyclical loads. Thus steel alloys and molded plastics would be suitable. For example, the pivot pins 16, 24, 26 and 34 may be made of a steel alloy while the arms 12 and 14, and the links 28 and 30 are made of a lubricative plastic, such as polytetrafluoroethylene (Teflon).

I claim:

1. A reader/writer for flexible data cards comprising, a card holder having a pair of pivotable arms being adapted to receive a flexible wallet-sized data card, the arms of the card holder being operable from an open position in which the arms are spaced apart suitably for receiving the data card to a clamped position in which the arms are brought towards each other to form a portion of a cylinder thereby bending the data card, said card being bent to conform to said portion of a cylinder thereby forming an arcuately flexed data card, actuator means associated with the card holder for pivoting said pivotable arms and for selectively maintaining the arms in one of said clamped position and open position, transducer means in operative relation with the arcuately flexed data card for reading and writing data on the data card, and means for providing relative rotational motion between the transducer means and the arcuately flexed data card.

2. The apparatus of claim 1 further defined by means for providing relative lateral motion between the transducer means and the arcuately flexed data card, said linear motion being in a direction parallel to the axis about which the data card is bent.

3. The apparatus of claim 1 wherein said transducer means and said arcuately flexed data card are in cooperative relation wherein said transducer means has an axis of rotational coaxial with the axis of said arcuately flexed data card.

4. The apparatus of claim 3 wherein said arcuately flexed card is stationary and at least a portion of said transducer means is caused to rotate about said coaxial axis.

5. The apparatus of claim 1 wherein each arm of said pair of arms has an arcuately curved side facing said data card, said arcuately sided arms acting cooperatively to form said card into a partially cylindrical configuration when in said clamped position.

6. The apparatus of claim 5 further comprising pinching means associated with said card holder means for securing a middle line of the data card and forcing said card to flex in a specific direction.

7. The apparatus of claim 5 wherein said actuator means is a rod operatively coupled to said pivotable arms via pivoting coupling links.

8. The apparatus of claim 1 wherein said transducer means comprises the elements of: (i) a light beam source producing a light beam; (ii) optics for directing the light beam onto said arcuately flexed data card; and (iii) photodetector means for receiving scattered light of the light beam scattered from off the surface of said data card.

9. The apparatus of claim 8 wherein said light beam source produces a first light beam of sufficient intensity to create data spots on said arcuately flexed data card and a second light beam with an intensity below a threshold for creating data spots.

10. A reader/writer for flexible optical data cards, comprising:

a card holder having a pair of pivotal arms, each having means for securing an edge of a flexible, wallet-sized data card having a strip of optical recording material disposed on a major face of the data card, the arms of the card holder having an open configuration in which the edge securing means are spaced apart a first distance for receiving a data card, and having a clamped position wherein said arms are pivotably rotated so that said edge securing means are spaced apart a distance less than said first distance thereby exerting a flexing force on said data card through said edge securing means and producing an arcuately flexed data card, the pivotable arms further each having arcuate sides proximate said edge securing means to provide a shape to which the arcuately flexed data card conforms, said shape being a portion of a cylinder, said strip of recording material being positioned on the radially inward side of said arcuately flexed data card, an optical system in operative relation with the arcuately flexed data card for reading and writing data on the data card, the optical system having a rotational axis coaxial with the center of curvature of the arcuately flexed data card forming a portion of a cylinder, and means for providing relative rotational motion between the optical system and the arcuately flexed data card.

11. The apparatus of claim 10 further comprising means for providing relative lateral motion along the axis coaxial to said optical system and said arcuately flexed data card formed into a shape being a portion of a cylinder.

12. The apparatus of claim 10 further including a rotational device associated with said optical system, whereby said arcuately flexed data card is stationary and at least a portion of said optical system is caused to rotate.

13. The apparatus of claim 10 further comprising pinching means having a cylindrical member positioned with respect to said card holder such that said data card is in contact with the cylindrical member for fixing a center line of the flexible data card about which line said data card is flexed, said cylindrical member having a cylindrical axis other than the axis of the arcuately flexed data card.

14. The apparatus of claim 10 further including an actuator coupled to the card holder for actuating the arms to pivot relative to one another from said open and clamped positions.

15. The apparatus of claim 10 wherein said optical system comprises the elements of: (i) a light beam source producing a light beam; (ii) optics for directing the light beam onto said arcuately flexed data card; and (iii) photodetector means for receiving scattered light of the light beam scattered from off the surface of said data card.

16. The apparatus of claim 15 wherein said light beam source produces a first light beam of sufficient intensity to create data spots on said arcuately flexed data card and a second light beam with an intensity below a threshold for creating data spots.

17. A method of reading and writing data on a flexible data card comprising the steps of, providing a flexible data card having data tracks oriented parallel to a major dimension of the data card, providing a card holder having two pivotable arcuate arms, said arms having an open position and a closed position, placing said card into said card holder, said card holder being in an open position, fixing the position of a center line of the card, closing said pivotable arms to form a portion of a cylinder, thereby bending the data card to conform to said pivotable arms in a cylindrical fashion about the fixed center line producing an arcuate data card, and performing one of reading and writing data in a data track of said arcuate data card with a rotating transducer means being coaxial with the center of curvature of the arcuate data card.

18. The method of claim 17 further defined by causing the transducer means to move laterally relative to the arcuate data card to another data track.

19. The method of claim 17 wherein said arcuate data card is held stationary and said transducer means rotates within the cylindrical data card.

20. A reader/writer for flexible optical cards comprising, first and second edge securing means for receiving a flexible, wallet-sized data card having a length and width and having a strip of optical recording material disposed on a first major side, the first and second edge securing means having open positions in which said securing means are spaced apart by a first distance to receive the data card and having clamped positions in which said first and second edge securing means are spaced apart by a second distance less than said first distance to form an arcuately flexed data card on which said first major side is the radially inward side, card forming means operatively associated with said first and second edge securing means for defining the shape of said arcuately flexed data card when said first and second edge securing means are in the clamped positions, wherein said edge securing means and said card forming means are incorporated in a pair of pivotable arms, said arms having complementary arcuate sides for forming an arcuately flexed data card into a portion of a cylinder, said arms each having an extension on an end distal to the pivoting point for securing an edge of said data card, an optical system in operative relation with the arcuately flexed data card for reading and writing data on the data card the optical system having a rotational axis positioned on the radial inward side of the arcuately flexed data card, and means for providing relative rotation motion between the optical system and the arcuately flexed data card.

21. The apparatus of claim 20 wherein said data card formed into a portion of a cylinder has a center of curvature being coaxial with the rotational axis of the optical system.

22. The apparatus of claim 21 wherein said optical system comprises a laser beam source, optical means for manipulating a laser beam, and detection means for receiving laser light reflected from the data card.

23. The apparatus of claim 22 wherein the arcuately flexed data card is rotated about the optical system which is stationary.

* * * * *